US011258952B2

(12) United States Patent
Kaufmann et al.

(10) Patent No.: US 11,258,952 B2
(45) Date of Patent: Feb. 22, 2022

(54) DEVICE AND METHOD FOR THE OPTICAL MONITORING OF MOVING COMPONENTS

(71) Applicants: Fraunhofer-Gesellschaft zur Foerderung der angewandten Forschung e.V., Munich (DE); Nawrocki Alpin GmbH, Berlin (DE)

(72) Inventors: Ilja Kaufmann, Ettlingen (DE); Clemens Scherer-Kloeckling, Minfeld (DE); Holger Nawrocki, Berlin (DE)

(73) Assignees: Fraunhofer-Gesellschaft zur Foerderung der Angewandten Forschung e.V., Munich (DE); Holger Nawrocki, Berlin (DE)

( * ) Notice: Subject to any disclaimer, the term of this patent is extended or adjusted under 35 U.S.C. 154(b) by 0 days.

(21) Appl. No.: 16/858,618

(22) Filed: Apr. 25, 2020

(65) Prior Publication Data

US 2020/0260013 A1    Aug. 13, 2020

Related U.S. Application Data

(63) Continuation of application No. PCT/EP2018/079084, filed on Oct. 24, 2018.

(30) Foreign Application Priority Data

Oct. 25, 2017    (DE) ..................... 10 2017 219 153.8

(51) Int. Cl.
*H04N 5/232*    (2006.01)
*F03D 17/00*    (2016.01)
(Continued)

(52) U.S. Cl.
CPC ......... *H04N 5/23299* (2018.08); *F03D 17/00* (2016.05); *G06T 7/0004* (2013.01);
(Continued)

(58) Field of Classification Search
None
See application file for complete search history.

(56) References Cited

U.S. PATENT DOCUMENTS 9,285,296 B2 *   3/2016   Georgeson ......... G01N 21/8851
9,791,272 B2 *  10/2017   Hinderling ............... G02B 3/14
(Continued)

FOREIGN PATENT DOCUMENTS

DE    102011017564 A1    10/2012
DE    102017005170 A1    11/2017
(Continued)

OTHER PUBLICATIONS

Ilja Kaufmann et al: Remote laser vibrometry for wind turbine blades, SPIE Newsroom, Apr. 1, 2016.
(Continued)

*Primary Examiner* — Talha M Nawaz
(74) *Attorney, Agent, or Firm* — Falk Ewers; Ewers IP Law PLLC

(57) ABSTRACT

A device for optically monitoring a moving component includes at least one first camera, the image detection region of which can be controlled by a tracking device and which is configured to capture at least one image of at least a part of the moving component, wherein the device further includes at least one second camera, which is configured to capture at least one image of the moving component. The device further includes an open-loop or closed-loop control unit, which receives image data of the second camera and which generates an open-loop or closed-loop control signal and transmits the open-loop or closed-loop control signal to the tracking device.

12 Claims, 3 Drawing Sheets

(51) Int. Cl.
  *G06T 7/292* (2017.01)
  *G06T 7/00* (2017.01)
  *H04N 5/04* (2006.01)
  *H04N 5/225* (2006.01)
  *H04N 5/247* (2006.01)
  *H04N 7/18* (2006.01)

(52) U.S. Cl.
  CPC ............... *G06T 7/292* (2017.01); *H04N 5/04* (2013.01); *H04N 5/2253* (2013.01); *H04N 5/247* (2013.01); *H04N 7/181* (2013.01); *G06T 2207/30164* (2013.01)

(56) References Cited

U.S. PATENT DOCUMENTS

| | | | |
|---|---|---|---|
| 2011/0228252 A1* | 9/2011 | Souvestre | G01S 17/48 356/5.01 |
| 2014/0168420 A1* | 6/2014 | Naderhirn | F03D 80/50 348/128 |
| 2014/0184786 A1* | 7/2014 | Georgeson | G01N 21/8422 348/128 |
| 2017/0011503 A1 | 1/2017 | Newman | |

FOREIGN PATENT DOCUMENTS

| | | |
|---|---|---|
| DE | 102016216730 A1 | 3/2018 |
| EP | 2887030 A1 | 6/2015 |

OTHER PUBLICATIONS

Office Action issued in German Patent Application No. DE 10 2017 219 153.8, dated Jun. 19, 2018 (from which this application claims priority) and English language translation thereof.

International Preliminary Report on Patentability of the European Patent Office in PCT/EP2018/079084 (from which this application claims priority) dated Jan. 16, 2020 and English-language translation thereof.

International Search Report of the European Patent Office in PCT/EP2018/079084 (from which this application claims priority) dated Jan. 18, 2019 and English-language translation thereof.

European Search Report dated Mar. 17, 2021 of the counterpart application No. EP20210883.3 and English language machine translation thereof.

* cited by examiner

DEVICE AND METHOD FOR THE OPTICAL MONITORING OF MOVING COMPONENTS

CROSS REFERENCE TO RELATED APPLICATIONS

This application is a continuation application of international patent application PCT/EP2018/079084, filed Oct. 24, 2018, designating the United States and claiming priority to German application 10 2017 219 153.8, filed Oct. 25, 2017, and the entire content of both applications is incorporated herein by reference.

TECHNICAL FIELD

The disclosure relates to an apparatus for optically monitoring moving components with at least one first camera, the image capture region of which can be influenced by a tracking device and which is configured to record at least one image of at least part of the component to be monitored. Furthermore, the disclosure relates to a method for optically monitoring moving components with at least one first camera, the image capture region of which becomes able to be influenced by a tracking device and which records at least one image of at least one part of the component to be monitored. Apparatuses and methods of this type can for example be used to monitor the rotor blades of wind turbines or other highly stressed components in industrial installations.

BACKGROUND

US 2017/0011503 A1 describes the examination of rotor blades of a wind turbine with an infrared camera during operation. To this end, the infrared camera is mounted on a pan-tilt platform that is moved by a control signal generated by a function generator. Consequently, the pan-tilt platform carries out a hard-encoded movement sequence. This hard-encoded movement sequence is synchronized to the passage of a rotor blade such that recording the rotor blade during running operation is possible.

However, this known apparatus is disadvantageous in that the tracking is always only implemented briefly with the required accuracy. The system needs to be aligned anew by the operating staff for each position on the rotor blade to be captured. Likewise, tracking must be adjusted with much outlay by the operator when the wind turbine adjusts to a changing wind direction or when there is a change in the rotational speed on account of changing wind speeds.

Furthermore, it is know from practical experience to capture the rotor blades of a wind turbine by photography when these are at a standstill. Lifting platforms, cranes, drones or rope-assisted access techniques can be used to this end. All these methods are however disadvantageous to the extent that there are losses in terms of yield as a result of stopping the wind turbine, with has a disadvantageous effect on the efficiency of the wind turbine. In addition, damage in the absence of stress at standstill can be different than during operation, and so damage might remain undetected.

SUMMARY

It is therefore an object of the disclosure to provide an apparatus and a method for optical monitoring moving components, which apparatus and method providing a high accuracy and avoiding unwanted downtimes.

The object is achieved by an apparatus for optically monitoring a moving component during operation and a method for optically monitoring a moving component during operation as described herein.

According to an aspect of the disclosure, the component to be monitored can be a machine element, a part of a vehicle or an aircraft, or a part of a wind turbine. The use of the apparatus is not restricted to monitoring moving components, but the apparatus can advantageously be used to this end.

The moving component can be in a regular operating state. For example, a wind turbine can be in operation, with its rotor rotating. In this case, the component to be monitored can be a rotor blade or the entire rotor star. An aircraft can fly over the apparatus according to an aspect of the disclosure, for example during its approach. In this case, the component to be monitored can be a wing, a fuselage structure or an engine nacelle. Since the apparatus according to an aspect of the disclosure and the method according to an aspect of the disclosure facilitate optical monitoring of such components in motion, unwanted downtimes of the components to be monitored or of the machines or devices equipped with the components are avoided.

For the purposes of the present disclosure, monitoring is understood to mean either permanent checking of the component or an occasional or only one-off documentation of a moving component.

Optical monitoring can be implemented with at least one first camera. The at least one first camera can take at least one image or a plurality of images of the component to be monitored. These images can be evaluated in order to identify mechanical damage to the component to be monitored.

The optical monitoring within the meaning of the present description is not restricted to the visible spectral range. Instead, photographic recordings in the infrared or ultraviolet spectral range or with gigahertz or terahertz waves are also considered to be images for optical monitoring within the meaning of the present disclosure. The technical limits emerge solely from the availability of a first camera for the corresponding spectral range, therefore in particular from the availability of corresponding image sensors or films and lens elements.

According to an aspect of the disclosure, the at least one first camera is equipped with a tracking device which can influence the image capture region of the former. Consequently, the first camera can track the movement of the component to be monitored. Consequently, the image capture region remains aligned on the component to be monitored or the portion to be monitored of the component to be monitored until the required images for assessing the component have been created. Should the component to be monitored have a large area, it can be subdivided into a plurality of portions for optical monitoring, with at least one image thereof being taken in each case. To this end, the image capture region of the first camera can be influenced with the tracking device in such a way that the plurality of portions is captured sequentially, with at least one image being taken in each case. This allows even large-area moving components, for example rotor stars of wind turbines, to be subjected to optical monitoring during operation. The images obtained in this fashion can subsequently be evaluated, either in automated fashion or by operating staff, in order to identify, e.g., mechanical damage due to the impact of objects or delaminations and in order thus to facilitate monitoring of the mechanical structures. This allows the expected service life to be determined and/or an impending failure to be predicted. This makes it possible to avoid consequential damage and/or avoid preventive maintenance that is unnecessary per se and/or identify damage at an early stage, which can then be remedied in timely fashion before more extensive failures occur.

According to an aspect of the disclosure, the apparatus can be additionally supplemented with at least one second camera, which is configured to capture at least one image of the component to be monitored. The second camera can be disposed in stationary fashion, i.e., the second camera is not connected to a tracking device. Moreover, the second camera can have a greater image angle than the first camera in some exemplary embodiments of the disclosure. Consequently, the second camera has, e.g., a wide-angle lens and the first camera has a telephoto lens. The first camera consequently captures a section of the component to be monitored with greater accuracy or higher resolution and the second camera either captures a larger section or the entire component to be monitored.

In some exemplary embodiments of the disclosure, both the first and the second camera are digital cameras, i.e., the cameras have a semiconductor sensor for image capture. By way of example, the semiconductor sensor can contain a complementary metal-oxide-semiconductor (CMOS) sensor, a charge coupled device (CCD) sensor, an image intensifier tube or similar elements known per se. Consequently, an analog or digital data stream which represents the captured images is available both at the output of the first and at the output of the second camera.

The image data of the second camera are fed to at least one open-loop or closed-loop control device. During operation, the latter generates a driving signal for the tracking device. Consequently, the tracking device follows this driving signal such that the image capture region of the first camera is always aligned on the component to be monitored or the specific portion to be examined. The driving signal can be implemented in a reactive fashion by the tracking device on account of an identified movement or deviation of the actual position of the camera from the setpoint position identified in the image.

In some exemplary embodiments of the disclosure, the open-loop or closed-loop control device contains at least one device for predicting the movement of the component to be monitored. The device for predicting movement extracts the component to be monitored from the image data of the second camera and calculates a future position of this component or of a desired portion of the surface of the component. To this end, data from the past can be used, i.e., a movement of the component to be monitored already carried out and detected in the past is advanced into the near future. In other exemplary embodiments of the disclosure, the device for predicting movement can include an optional memory, which is configured to record constraints of the movement. By way of example, the fact that specific components to be monitored move along a circular trajectory can be stored. Taking this constraint into consideration, the device for predicting movement consequently only still has to capture the rotational speed or angular speed and the spatial alignment of the shaft in order to create an exact movement prediction. In the case of components to be monitored that can move freely in three-dimensional space as a matter of principle, such as approaching aircraft, for example, it is possible, by contrast, to store freer constraints, for example filters for course and speed or maximum values of the first derivatives of these values. Methods and apparatuses for predicting movement of objects in three-dimensional space using camera images are known to a person skilled in the art as a matter of principle. The present disclosure does not teach the use of a specific algorithm or a specific prediction model as solution principle. The data of the movement prediction are subsequently used by the open-loop or closed-loop control device for the purposes of generating a driving signal for the tracking device.

In some exemplary embodiments of the disclosure, the open-loop or closed-loop control device can additionally have a memory for recording a measurement program. Portions of the moving component to be examined and the examination sequence of individual portions can be stored in this memory prior to the start of measurement. This facilitates fully automated monitoring of the moving component by virtue of individual portions being captured with great accuracy, said individual portions subsequently either being analyzed individually or being able to be merged to form a large, high-resolution recording of the component to be monitored. Here, capturing the movement in parallel with the aid of the second camera ensures that the first camera reliably follows the component to be monitored, even in the case of complex movement sequences, and that all desired portions can be captured in reproducible fashion.

In some exemplary embodiments of the disclosure, the apparatus can furthermore contain at least one laser, the beam direction of which is able to be influenced by the tracking device. This laser allows a beam spot to be generated at a predeterminable position on the component to be monitored. The position of this beam spot can be captured by the first camera and/or the second camera. By comparing the position of the beam spot with the desired setpoint position, it is possible to produce a closed-loop control signal for the tracking device, which reduces the deviation between the setpoint and actual position. This facilitates tracking of the image capture region of the first camera with greater accuracy.

In some exemplary embodiments of the disclosure, the laser can emit radiation in the infrared or in the visible spectral range in order thus to be easily captured by one of the cameras. To the extent that the spectral range of the first camera differs from that of the second camera and the latter is matched to the laser, the laser light can be captured by the second camera but not by the first.

In some exemplary embodiments of the disclosure, the apparatus can furthermore contain at least one third camera, which is configured to capture the beam spot of the laser on the component to be monitored and feed this to the open-loop or closed-loop control device. In some exemplary embodiments of the disclosure, the third camera can be sensitive in a different spectral range to the first camera. This avoids the laser beam being captured by the first camera and thus being incorrectly interpreted as damage to the component to be monitored.

In some exemplary embodiments of the disclosure, the first camera can additionally be rotatable about its optical axis. This allows the relative alignment between the portion of the component to be captured and the camera to be kept constant while the image is being recorded. This allows motion blur to be avoided, particularly when recording rotating components, and so higher-quality recordings are available and facilitate a more precise damage analysis or condition documentation or damage prediction.

In some exemplary embodiments of the disclosure, the image sensor of the first camera can be rotatable about the optical axis of the first camera. Since this consequently reduces the mass and size of the moving component, a rotation can be implemented with less effort or greater speed.

In both cases, the optical axis denotes the axis of symmetry of the lens element arrangement of the lens and hence also denotes the axis of symmetry of the image region captured by the lens. In some exemplary embodiments, a rotation can take place continuously in one direction of rotation, and so the camera or its image capture region can continuously track the movement of a rotating component. In other exemplary embodiments of the disclosure, a rotation can only take place through a predeterminable angular range which is less than or equal to 360°. In other exemplary embodiments of the disclosure, the angular range of the rotation can be less than or equal to 270° or less than or equal to 180° or less than or equal to 90°. Consequently, the camera or the image capture region continuously perform a back and forth rotation or a rocking movement. As a result, the movement of the camera or of the image sensor is synchronized with the movement of the component, at least for the moment of the recording. This allows the use of a cable connection to the camera for power supply and data interchange. Consequently, the data rate can be increased by this measure, particularly in the case of high-resolution image sensors.

In some exemplary embodiments of the disclosure, the tracking device can contain a pan-tilt platform on which at least the first camera and the optional laser are mounted. In a manner known per se, the pan-tilt platform contains a platform on which the components of the apparatus to be moved are mounted and which is moved pneumatically, hydraulically or by an electric motor. To this end, the platform can be rotated or swiveled about at least one axis, but typically about at least two axes. In other exemplary embodiments of the disclosure, the platform can be disposed on a hexapod, which allows the platform to be rotated and swiveled by changing the length of the individual legs of the hexapod.

In some exemplary embodiments of the disclosure, the tracking device contains at least one movable mirror, which deflects the beam path of a lens of the first camera and/or the beam path of the optional laser. In contrast to moving the entire camera, a mirror can have reduced moving masses, and so tracking can be implemented at a higher speed.

In some exemplary embodiments of the disclosure, the tracking device can facilitate at least one rotational movement of the first camera about an axis perpendicular to the optical axis. In some exemplary embodiments of the disclosure, the tracking device can also facilitate a rotational movement of the first camera about two axes that are perpendicular to the optical axis and, in turn, also perpendicular to one another. This can reduce the complexity connected to the tracking device in specific applications, for example when monitoring a wind turbine. By way of example, for the purposes of monitoring a rotor star of a wind turbine, at least the first camera can be disposed below the axis of rotation of the rotor star and in a plane orthogonal to the rotor plane. In this case, the rotor blades of the rotor star cyclically pass through the image capture region from top to bottom or from bottom to top, and so a single panning movement of the camera suffices to capture the rotor blades along their longitudinal extent in a plurality of portions. In general, for the purposes of monitoring a rotating component at least the first camera is disposed away from the axis of rotation of said component and the image capture is synchronized in such a way that the component to be monitored is aligned approximately orthogonal on the connecting line between the optical axis and the axis of rotation of the component during the image capture.

In some exemplary embodiments of the disclosure, the tracking device can facilitate at least one rotational movement of the first camera about an axis that differs from the optical axis and does not extend parallel to said optical axis. In some exemplary embodiments of the disclosure, a non-parallel extent can be understood to mean that the axis of rotation and the optical axis include an angle of more than 2° or more than 3° or more than 5° with respect to one another.

In some exemplary embodiments of the disclosure, the component to be monitored, for example a rotor star, can be captured on both sides of the axis of rotation. To the extent that the camera is disposed below, to the side of or above the axis of rotation, this allows an accurate inspection of the leading and trailing edges of the rotor blade.

In some exemplary embodiments of the disclosure, it is possible to capture both the front and back side of the component to be monitored. This allows optical detection of damage to all relevant component surfaces.

BRIEF DESCRIPTION OF THE DRAWINGS

The disclosure will now be described with reference to the drawings wherein.

DESCRIPTION OF EXEMPLARY EMBODIMENTS

Figure 1:
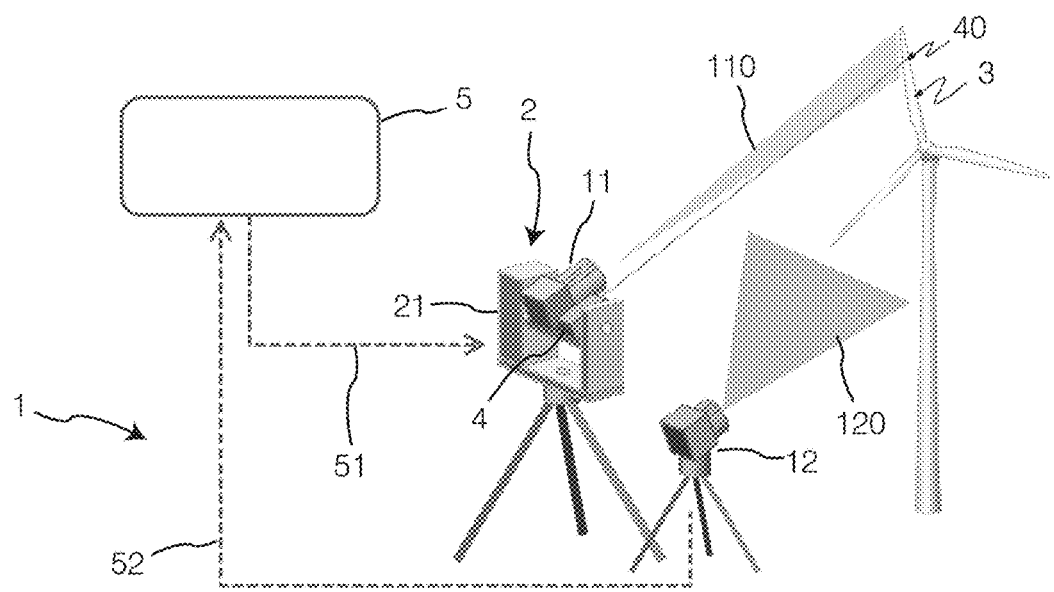
FIG. 1 shows a schematic illustration of the apparatus for optically monitoring moving components including a tracking device according to a first exemplary embodiment of the disclosure.

FIG. 1 is shows an apparatus 1 for optically monitoring moving components including a tracking device 2 according to a first exemplary embodiment of the disclosure. FIG. 1 illustrates a wind turbine with a rotor star. The rotor star contains three rotor blades, which represent the components 3 to be monitored in the illustrated exemplary embodiment. Rotor blades of wind turbines are typically made from fiber-reinforced thermosetting plastics. The rotor blades are exposed to mechanical stress due to the rotation and the incoming wind. Moreover, the rotor blades are exposed to changes in temperature, moisture and UV radiation. These are therefore highly stressed, moving components. Failure of a rotor blade has considerable damage potential, firstly due to falling parts. Secondly, the remaining mechanical structure of the wind turbine is also significantly stressed by the unbalance of a damaged rotor star. There is therefore a need for monitoring the rotor blades in order to be able to replace them prior to failure in the event of considerable damage. At the same time, monitoring should take place during operation to avoid losses in terms of yield. In the same way as explained in this description in exemplary fashion on the basis of the rotor blades of a wind turbine, other moving components 3 can naturally also be monitored, for example wings and fuselage structures of approaching airplanes or parts of production machines or components in production requiring quality control.

The apparatus 1 for monitoring moving components has at least one first camera 11. The first camera 11 has an image capture region 110, which is specified by the size of the image sensor of the first camera 11 and the focal length of the lens connected to the first camera 11. In the illustrated exemplary embodiment, the image capture region 110 is comparatively narrow, i.e., the first camera 11 can represent a comparatively small area with a high resolution, even if this area is far away. As yet to be explained below on the basis of FIG. 2, a plurality of individual images of the rotor blade 3 can be recorded with the first camera 11, said individual images can subsequently be analyzed individually or merged to form an overall recording of the component to be monitored.

In order to be able to track the image capture region 110 when the component 3 to be monitored is moved, the first camera 11 is mounted on a tracking device 2. In the illustrated first exemplary embodiment, the tracking device 2 contains a pan-tilt platform 21. The pan-tilt platform is rotatably fastened to a tripod in order to be able to change the horizontal direction of the image capture region 110. Moreover, the pan-tilt platform can be moved vertically with another drive. Consequently, the pan-tilt platform allows the first camera 11 to be moved in such a way that the image capture region 110 follows the movement of the component 3 to be monitored.

The driving signal of the tracking device 2 is generated by an open-loop or closed-loop control device 5. The open-loop or closed-loop control device 5 is connected to the tracking device 2 by way of a cable connection 51 or else by way of a wireless data connection.

The driving signal is generated by the open-loop or closed-loop control device 5 on the basis of the image data of a second camera 12, which is connected to the open-loop or closed-loop control device 5 by way of a cable connection 52. In some exemplary embodiments of the disclosure, a radio interface can also find use here. The open-loop or closed-loop control device 5 can contain software that creates a driving signal of the tracking device from input data when the software is executed on a microprocessor.

The second camera 12 is also mounted on a tripod and has an image capture region 120. The image capture region 120 has a larger image angle, i.e., the focal length of the lens of the second camera 12 is smaller in the case of an image sensor with the same size. Consequently, the second camera 12 catches a larger section of the component 3 to be monitored or else the entire component 3 to be monitored. The second camera can be disposed in stationary fashion, i.e., the second camera is not connected to a tracking device.

From the image data of the second camera 12, which are supplied to the open-loop or closed-loop control device 5, the latter calculates a movement prediction for the component 3 to be monitored. Since the open-loop or closed-loop control device consequently knows where the component 3 to be monitored or the portion of the component 3 currently to be captured will be located at the recording time and since the adjustment speed of the tracking device 2 is known, the open-loop or closed-loop control device can output a control signal to the tracking device, which directs the image capturing region of the first camera 11 at predetermined times to the respective portion of the component 3 to be monitored. The optional tracking even during the recording avoids motion blur and consequently increases the quality of the monitoring by taking better images.

An optional laser 4 can be mounted on the tracking device 2 for the purposes of increasing the accuracy of the tracking, said laser generating a beam spot 40 on the component 3 to be monitored. The position of the beam spot 40 can be captured by the first camera and/or the second camera 12. Optionally, an optional third camera can also be used to this end, the latter not being illustrated in FIG. 1 and likewise being connected to the open-loop or closed-loop control device 5. The actual value of the beam spot 40 measured in this way is compared to desired setpoint values, and so the open-loop or closed-loop control device 5 can generate an additional correction signal and output the latter to the pan-tilt platform 2. As a result, the quality of the captured images can be further improved, and so the moving component 3 can be monitored more precisely.

FIG. 2 again shows a rotor blade 3, which rotates around the hub 35 of a rotor star. In some exemplary embodiments of the disclosure, the rotor blade 3 as a component to be monitored is always captured at a point in time at which the rotor blade is almost horizontal. Consequently, two recordings can be made with the respective image capture region 110a or 110b per revolution of the rotor blade. Since, as a rule, the camera 11 with the tracking device 2 has a lower height than the hub height of the wind turbine, the leading edge of the rotor blade is also visible in the image capture region 110a. By contrast, the trailing edge is also visible in the image capturing region 110b in addition to the outer surface of the rotor blade.

Figure 2:
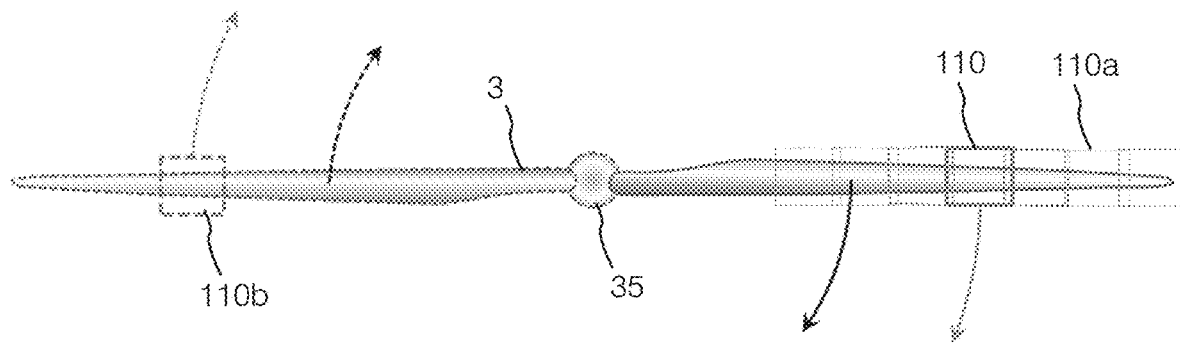
FIG. 2 shows how the method for optically monitoring moving components is carried out according to an exemplary embodiment of the disclosure.

FIG. 2 also shows how a plurality of individual images that can be combined to form a high-resolution recording of the component to be monitored can be generated by horizontally displacing the image capture region 110 by the tracking device 2. If such recordings are captured on both the upstream and downstream sides of the wind turbine, the surface of the component 3 can be completely captured.

Alternative exemplary embodiments of a tracking device are explained in more detail with further reference to FIGS. 3 to 7. Here, the same reference signs denote the same component parts of the disclosure, and so the following description is restricted to the essential differences. FIGS. 3 to 7 illustrate neither the open-loop or closed-loop control device nor the second camera 12. However, this does not mean that these devices are not present in the further exemplary embodiments of the disclosure.

Figure 3:
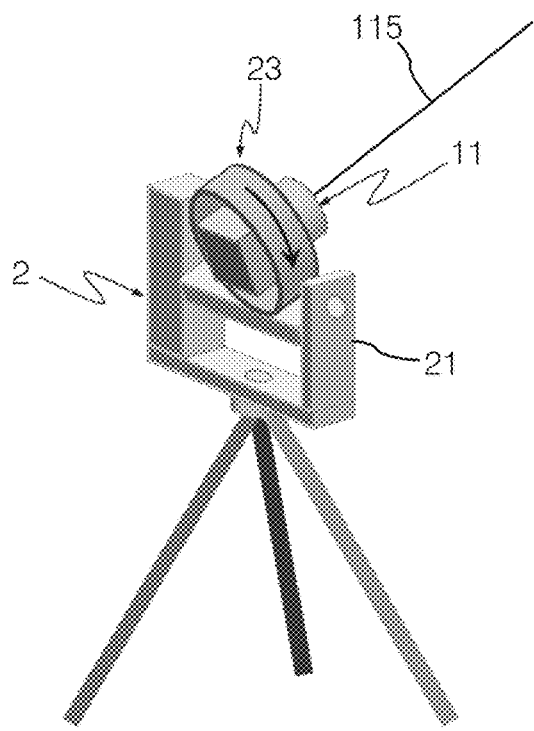
FIG. 3 shows a tracking device according to a second exemplary embodiment of the disclosure.

A second exemplary embodiment of the tracking device 2 is explained with reference to FIG. 3. The second exemplary embodiment also has a pan-tilt platform 21, as was described in detail with reference to FIG. 1. Additionally, FIG. 3 shows a device 23 for rotating the first camera 11 about its optical axis 115. Here, the optical axis 115 denotes the axis of symmetry of the lens or the axis of symmetry of the image capture region 110.

The rotation of the first camera 11 takes into account the fact that the alignment of the rotor blade of the wind turbine changes during operation due to its rotation. This can be neglected in the case of short exposure times, which are short in relation to the rotational speed. However, recordings that require a longer exposure time suffer from motion blur in this case. This can be avoided by virtue of the first camera 11 also rotating and thus the relative alignment of the image capture region 110 on the component 3 remaining unchanged, at least during the generation of the image. Since wind turbines, for example, only have comparatively slow rotor speeds of approximately 10 to approximately 20 revolutions per minute, it is possible to let the first camera 11 rotate at the same speed so that motion blur can be avoided and the alignment of the first camera with respect to the rotor star remains unchanged. The moving components can be monitored with greater accuracy on account of the increased quality of the recorded images.

Figure 4:
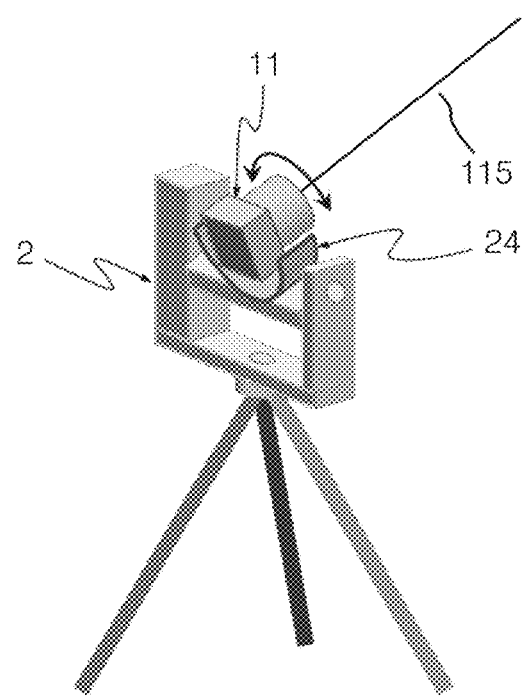
FIG. 4 shows a tracking device according to a third exemplary embodiment of the disclosure.

FIG. 4 shows a third exemplary embodiment of the tracking device 2. The third exemplary embodiment also includes a pan-tilt platform as described above with reference to FIGS. 1 and 3. In the third exemplary embodiment, too, the first camera 11 can be rotated about its optical axis 115. In contrast to the second exemplary embodiment shown in FIG. 3, the rotation device 24 in the second exemplary embodiment, however, does not allow a complete rotation through 360° or a multiple thereof. Rather, the first camera 11 is only rotated from its zero position by +/−90°. This allows a rotational tracking of the image capturing region 110 through a corresponding angle of approximately 180° of the rotor blade to be monitored. In other exemplary embodiments of the disclosure, the angle can be chosen differently. Then, the image capture is completed, and the camera is turned back to its original position. This embodiment is advantageous in that both the power supply and the data transmission of the first camera 11 can be implemented by way of a cable connection, and so higher data rates can be made possible.

Figure 5:
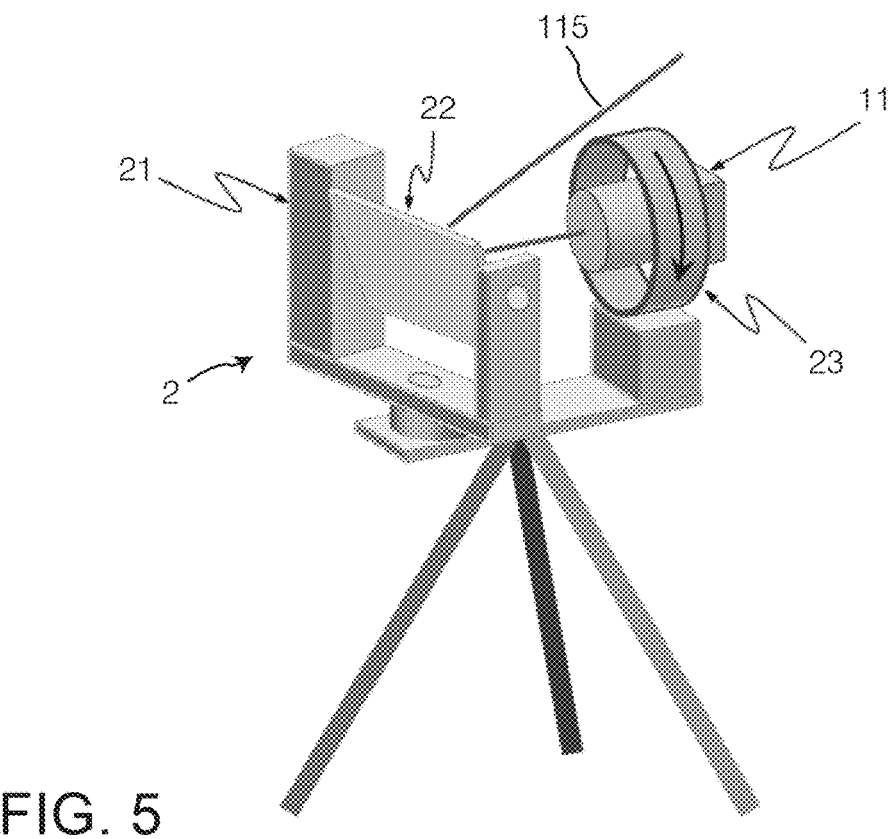
FIG. 5 shows a tracking device according to a fourth exemplary embodiment of the disclosure.

FIG. 5 shows a fourth exemplary embodiment of a tracking device 2. The fourth exemplary embodiment also includes a pan-tilt platform 21, as described above. However, it is not the first camera 11 that is fastened thereto but a mirror 22, the latter deflecting the beam path of the lens of the camera 11 in the desired direction. This is shown schematically in FIG. 5 based on the optical axis 115. Since lower masses must be moved to track the image capture region in this way, the tracking can take place more quickly.

As FIG. 5 further shows, the fourth exemplary embodiment, too, can optionally be provided with a device 23 for rotation, which rotates the first camera 11 about the optical axis 115 of the latter.

Figure 7:
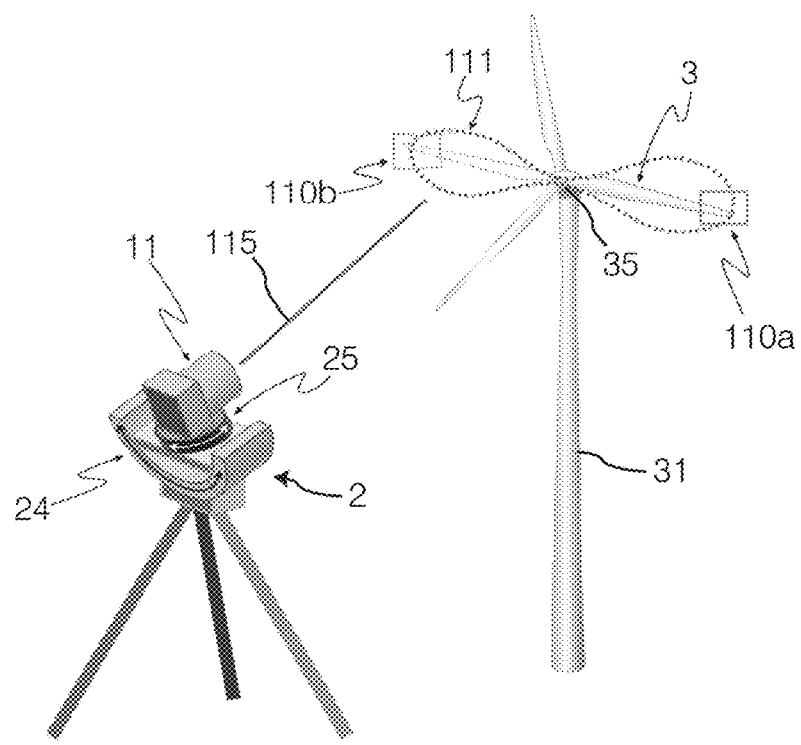
FIG. 7 shows a tracking device according to a sixth exemplary embodiment of the disclosure.
Figure 6:
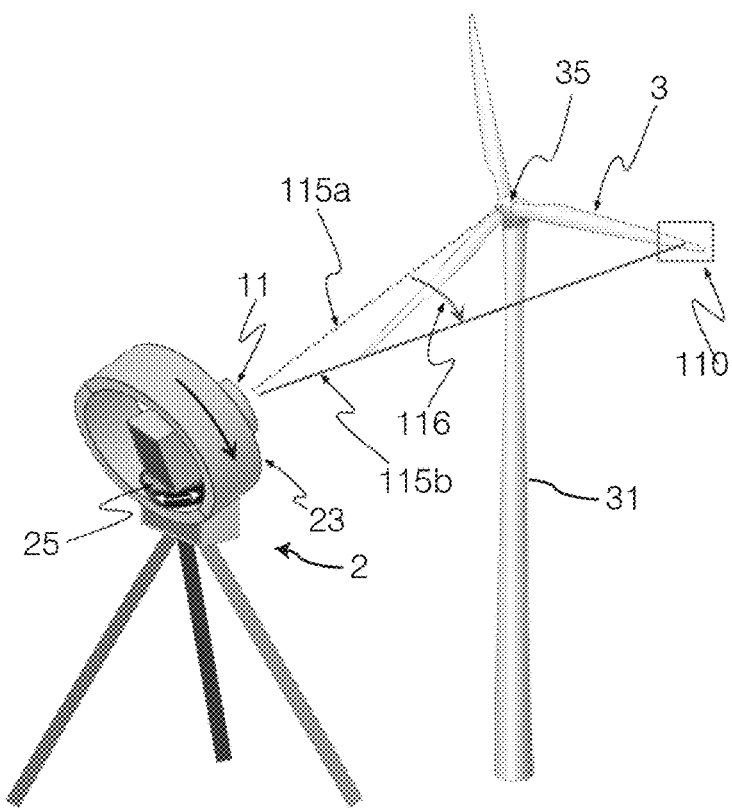
FIG. 6 shows a tracking device according to a fifth exemplary embodiment of the disclosure.

Fifth and sixth exemplary embodiments of the tracking device 2 are explained with reference to FIGS. 6 and 7. As shown in FIGS. 6 and 7, the tracking device 2 is provided without a pan-tilt platform, but only utilizes a horizontal panning device 25. As illustrated in FIG. 6, this horizontal panning device 25 can be used to swivel the image capture region from a first position 115a through an angle 116 into a second position 115b. For reasons of clarity, the two positions of the image capture region 110 are schematized by the optical axis 115 in this case.

If the component 3 to be monitored is consequently captured in a horizontal position, as shown in FIG. 2, the horizontal swivel movement is sufficient to pan the image capture region 110 along the entire length of the component 3 to be monitored.

Should a continuous image capture of the component 3 be desired, the fifth exemplary embodiment can also be provided with a device 23 for rotating the first camera. The device 23 makes it possible to follow the revolving rotor blade 3 by rotating the camera 11 in the same direction. At the same time, the rotor blade can be scanned along its length by the horizontal panning device 25. Consequently, the fifth exemplary embodiment shown in FIG. 6 also allows a complete tracking of the image capture region 110 with less effort when compared to the first embodiment by virtue of dispensing with the pan-tilt platform.

The sixth embodiment according to FIG. 7 has a functionality similar to that of the fifth exemplary embodiment described above. However, there is no revolving rotation of the first camera 11. Instead, the first camera 11 performs an oscillating or rocking movement, as described above with reference to the third exemplary embodiment shown in FIG. 4. Thus, the image capture region 110 according to the sixth exemplary embodiment can be moved along a figure-of-eight line 111 in order thus to generate, in an angular region around the horizontal line of the rotor blade, images for optical monitoring with tracking of the image capture region 110.

Naturally, the disclosure is not restricted to the illustrated exemplary embodiments. Therefore, the description should not be construed as restrictive but considered to be explanatory. The following claims should be understood to mean that a feature mentioned is present in at least one embodiment of the disclosure. This does not preclude the presence of other features. To the extent that the claims and the above description define "first" and "second" exemplary embodiments, then this label serves to differentiate between two similar embodiments without establishing a ranking.

Thus, it is understood that the foregoing description is that of the exemplary embodiments of the disclosure and that various changes and modifications may be made thereto without departing from the spirit and scope of the disclosure as defined in the appended claims.

What is claimed is:

1. An apparatus for optically monitoring a moving component during operation, the moving component moving during the operation, the apparatus comprising:
   a tracking device;
   a first camera having an image capture region, an optical axis, and an image sensor, the image capture region being controllable by the tracking device such that the first camera follows a movement of the moving component, the first camera being configured to capture at least one first image of at least a part of the moving component, and at least one of the first camera and the image sensor being rotatable about the optical axis such that a relative alignment of the image capture region with the moving component remains unchanged when the at least one first image is captured;
   a second camera configured to capture at least one second image of the moving component; and
   an open-loop or closed-loop control device configured to:
      receive image data from the second camera,
      generate an open-loop or closed-loop control signal,
      transmit the open-loop or closed-loop control signal to the tracking device, and
      predict the movement of the moving component.

2. The apparatus as claimed in claim 1, wherein:
   the first camera has a first image angle,
   the second camera has a second image angle, and
   the first image angle is smaller than the second image angle.

3. The apparatus as claimed in claim 1, wherein the second camera is arranged stationary.

4. The apparatus as claimed in claim 1, further comprising:
   a laser having a beam with a beam direction, the beam direction being controllable by the tracking device.

5. The apparatus as claimed in claim 4, further comprising:
   a third camera configured to capture a beam spot of the laser on the moving component and to transmit the data representing a position of the beam spot to the open-loop or closed-loop control device.

6. The apparatus as claimed in claim 1, wherein the tracking device at least one of:
   includes a pan-tilt platform and the first camera is mounted von the pan-tilt platform,
   includes a movable mirror which deflects a beam path of a lens of the first camera, and
   is configured to permit at least a rotational movement of the first camera about an axis which differs from the optical axis and which does not extend parallel to the optical axis.

7. A method for optically monitoring the moving component of a wind turbine, the method comprising:
   monitoring the moving component of the wind turbine with the apparatus as claimed in claim 1.

8. A method for optically monitoring moving a moving component during operation, the method comprising:
   monitoring the moving component with a first camera having an image capture region, an optical axis, and an image sensor;
   controlling the image capture region by a tracking device such that the first camera follows a movement of the moving component;
   capturing, with the first camera, at least one first image of at least a part of the moving component;
   capturing, with a second camera, at least one second image of the moving component;
   receiving the at least one second image by an open-loop or closed-loop control device;
   generating, by the open-loop or closed-loop control device, an open-loop or closed-loop control signal;
   transmitting the open-loop or closed-loop control signal to the tracking device;
   rotating at least one of the first camera and the image sensor about the optical axis of the first camera such that a relative alignment of the image capture region with the moving component remains unchanged when the at least one first image is captured; and
   predicting the movement of the moving component by the open-loop or closed-loop control device.

9. The method as claimed in claim 8, wherein:
   the first camera has a first image angle,
   the second camera has a second image angle, and
   the first image angle is smaller than the second image angle.

10. The method as claimed in claim 8, further comprising:
   generating a beam spot on the moving component with a laser having a beam direction;
   controlling the beam direction with the tracking device; and
   capturing the beam spot with at least one of the first camera and the second camera.

11. The method as claimed in claim 8, wherein:
   the moving component is a rotating component having an axis of rotation, and
   the method further comprises:
   arranging at least the first camera outside the axis of rotation of the rotating component; and
   synchronizing the capturing of the at least one first image and the at least one second image such that the rotating component is aligned substantially orthogonal on a connecting line between the optical axis and the axis of rotation of the rotating component when capturing the at least one first image and the at least one second image.

12. The method as claimed in claim 11, further comprising:
   capturing at least one of (a) both sides of the axis of rotation of the rotating component, and (b) a front side and a back side of the rotating component.

* * * * *